United States Patent Office 2,773,062
Patented Dec. 4, 1956

2,773,062

ORGANIC COMPOUNDS AND INSECTICIDAL COMPOSITIONS

Edward A. Prill, Yonkers, N. Y., assignor to Boyce Thompson Institute for Plant Research, Inc., a corporation of New York No Drawing. Application October 6, 1953, Serial No. 384,523

4 Claims. (Cl. 260—247.2)

This invention relates to organic compounds, and has for its object the provision of a new class of organic compounds represented by the formula

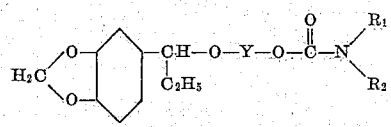

wherein Y is a member of the group consisting of divalent alkylene radicals containing from 2 to 6 carbon atoms and divalent alkylene radicals containing from 2 to 6 carbon atoms which are interrupted by an ethereal oxygen atom, $R_1$ and $R_2$ are selected from the group consisting of the following elements: The hydrogen atom, monovalent alkyl radicals having from 1 to 20 carbon atoms, monovalent hydrocarbon cycloalkyl radicals having not more than six carbon atoms in a cyclic ring and having not more than 20 carbon atoms in the radical, monovalent alkoxyalkyl radicals having not more than 12 carbon atoms, the phenyl radical, monovalent aralkyl radicals having 7 to 10 carbon atoms, the furfuryl radical wherein not more than one of $R_1$ and $R_2$ is furfuryl, the tetrahydrofurfuryl radical wherein not more than one of $R_1$ and $R_2$ is tetrahydrofurfuryl, not more than one of $R_1$ and $R_2$ being hydrogen, and elements which form, with the nitrogen atom of

to which they are attached, the piperidino radical, the morpholino radical, the 2-methylpiperidino radical, the 5-ethyl-2 methylpiperidino radical, and the pyrrolidino radical.

This application is a continuation-in-part of my copending application Serial Number 335,167, filed on February 4, 1953.

The compounds of this invention are useful as insecticides, particularly as synergists and extenders for pyrethrins, allethrin 3-allyl - 2 - methyl-4-oxo-2-cyclopentenyl chrysanthemummonocarboxylate and structurally related insecticides. Usually, heretofore, the synergists in use have been more active when used with pyrethrins than when used with allethrin. Some of the compounds given as specific examples for the present invention, such as Examples Nos. 6 and 8, are about equal or better when used with allethrin as compared with pyrethrins, which is very desirable from the standpoint of making more active formulations with the less expensive allethrin. My invention, accordingly, provides insecticidal compositions comprising one or more compounds of the invention in admixture with pyrethrins, allethrin, and structurally related insecticides.

The compounds of the present invention may be easily prepared from readily available starting materials and they are free from objectionable odors and irritations.

All of the compounds given in the following specific examples are viscous oily liquids. When used in formulations, the compounds prepared as described herein contribute negligible coloration.

For convenience in describing the various specific examples, the compounds are divided into three groups. In preparing the compounds, the last reaction step is the same and involves the reaction of isosafrole hydrochloride with a compound containing an alcoholic hydroxyl radical. The following is a convenient laboratory process for carrying out the last step.

The intermediary hydroxy compound, plus an inert mutual reaction solvent when needed, was placed in an Erlenmeyer flask to form a shallow layer. To this was added a drop of triethylamine and an excess of powdered sodium bicarbonate. A slight molecular excess of isosafrole hydrochloride was slowly added with frequent shaking and external cooling to prevent a temperature rise above about 50° C. The reaction was allowed to continue at room temperature for one or two days. Then sufficient β-diethylaminoethanol was added to tie up any remaining isosafrole hydrochloride to form the compound $$3,4-CH_2O_2C_6H_3-CH-O-CH_2CH_2-N(C_2H_5)_2$$
$$|$$
$$C_2H_5$$

which could later be removed by washing with aqueous acid. In commercial practice the remaining isosafrole hydrochloride could be tied up by reaction with any reactive hydroxy compound, such as methyl or ethyl alcohol. The reaction mixture was subjected to steam distillation to remove volatile impurities, the oily residue was taken up in ethyl ether, washed with dilute hydrochloric acid, then washed with sodium bicarbonate. After drying over anhydrous sodium sulfate and removal of the solvent, the compound was obtained in substantially pure form. This reaction step constitutes the formation of a mixed ether in which the ethereal oxygen atom is attached on one side to the α-ethylpiperonyl radical and on the other side to the organic radical from the intermediary hydroxy compound used.

Examples of group 1, compounds of the general formula

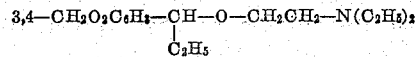

This group of compounds was made by the following general method. An excess of ethylene carbonate was taken to react with the indicated amine to make the intermediary compounds of the formula

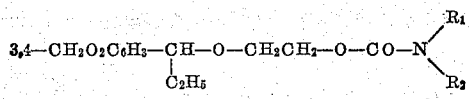

When necessary, dioxane was used as an inert mutual solvent. The reaction was often exothermic and required external cooling. The reaction was allowed to proceed at a temperature not above 70° until the next day. When substantially all of the amine had reacted, the crude reaction mixture could be used without purification in the next reaction step because any remaining ethylene carbonate would be inert there. When there was unreacted amine present and the intermediary compound was water-insoluble, the excess amine and ethylene carbonate could be removed by washing with dilute aqueous hydrochloric acid, or dilute aqueous acetic acid in Example 15. In each case, the intermediary was reacted with isosafrole hydrochloride in the manner already indicated.

Example 1.—$R_1$ is cyclohexyl, $R_2$ is H. Made by the use of cyclohexylamine.

*Example 2.—*

is the piperidino radical. Made by the use of piperidine.

*Example 3.*—$R_1$ is n-hexyl, $R_2$ is H. Made by the use of n-hexylamine.

*Example 4.*—$R_1$ is 2-ethylhexyl, $R_2$ is H. Made by the use of 2-ethylhexylamine.

*Example 5.*—$R_1$ and $R_2$ are each n-butyl. Made by the use of di-n-butylamine.

*Example 6.*—$R_1$ is α-methylbenzyl, $R_2$ is H. Made by the use of α-methylbenzylamine.

*Example 7.—*

is the morpholino radical. Made by the use of morpholine.

*Example 8.*—$R_1$ is furfuryl, $R_2$ is H. Made by the use of furfurylamine.

*Example 9.*—$R_1$ is tetrahydrofurfuryl, $R_2$ is H. Made by the use of tetrahydrofurfurylamine.

*Example 10.*—$R_1$ is β-phenylethyl, $R_2$ is H. Made by the use of β-phenylethylamine.

*Example 11.*—$R_1$ is benzyl, $R_2$ is H. Made by the use of benzylamine.

*Example 12.*—$R_1$ is 3,3,5-trimethylcyclohexyl, $R_2$ is H. Made by the use of 3,3,5-trimethylcyclohexylamine.

*Example 13.—*

is the 2-methylpiperidino radical. Made by the use of 2-methylpiperidine.

*Example 14.*—$R_1$ is 3,5,5-trimethylhexyl, $R_2$ is H. Made by the use of 3,5,5-trimethylhexylamine.

*Example 15.*—$R_1$ is dehydroabietyl ($C_{20}H_{29}$—), $R_2$ is H. Made by the use of technical dehydroabietylamine.

*Examples of group 2 compounds of the general formula*

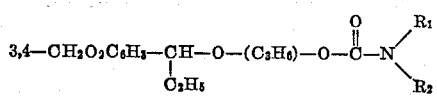

These were made in the same manner as the compounds of group 4 except that propylene carbonate was used in place of ethylene carbonate.

*Example 16.*—$R_1$ is 3,3,5-trimethylcyclohexyl, $R_2$ is H. Made by the use of 3,3,5-trimethylcyclohexylamine.

*Example 17.*—$R_1$ is n-hexyl, $R_2$ is H. Made by the use of n-hexylamine.

In addition to the amines which have been mentioned in connection with the examples of groups 1 and 2, other amines of the formula

wherein $R_1$ and $R_2$ are as defined under the broad scope of the invention, also may be similarly used to make compounds of each of these groups. These amines include such as, n-octylamine, n-decylamine, n-dodecylamine, 3-butoxypropylamine, 3-(2-ethylhexyloxy)propylamine, 5-ethyl-2-methylpiperidine, pyrrolidine, and the like. It is obvious that in each of the resulting compounds the values of $R_1$ and $R_2$ will be the same as in the particular amine used.

*Examples of group 3 compounds of the general formula*

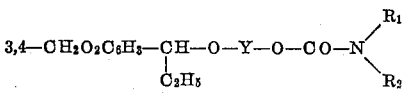

The general method of making this group of compounds consists of slowly adding a hydrocarbon isocyanate or dihydrocarbon carbamyl chloride to an excess of a dihydroxy compound (HO—Y—OH) in an inert mutual solvent such as dioxane. After reaction, the excess HO—Y—OH was removed by washing with water. The intermediary compound

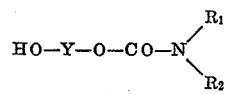

was then reacted with isosafrole hydrochloride in the manner already indicated.

*Example 18.*—Y is —$CH_2CH_2CH_2CH_2$—, $R_1$ is phenyl, $R_2$ is H. The intermediary compound was made by the reaction of phenyl isocyanate with an excess of 1,4-butanediol.

*Example 19.*—Y is —$CH_2CH_2CH_2CH_2$—, $R_1$ is n-heptyl, $R_2$ is H. The intermediary compound was made by the reaction of n-heptyl isocyanate with an excess of butane-1,4-diol.

*Example 20.*—Y is —$CH_2C\equiv C$—$CH_2$—, $R_1$ is n-heptyl, $R_2$ is H. The intemediary compound was made by the reaction of n-heptyl isocyanate with an excess of 2-butyne-1,4-diol.

*Example 21.*—Y is —$CH_2CH_2$—O—$CH_2CH_2$—, $R_1$ is n-heptyl, $R_2$ is H. The intermediary compound was made by the reaction of n-heptyl isocyanate with an excess of diethylene glycol.

Various other intermediary compounds of the formula

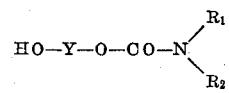

may be similarly made by the reaction of a dihydroxy compound HO—Y—OH with a hydrocarbon isocyanate. $R_1NCO$, according to the equation:

HO—Y—OH+$R_1$NCO→HO—Y—O—CO—NH—$R_1$ or by the reaction of a dihydrocarbon carbamyl chloride

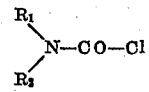

according to the equation:

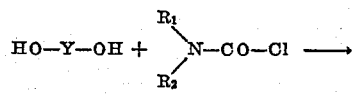

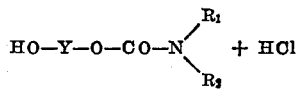

The intermediary compound may then be reacted with isosafrole hydrochloride in the manner already indicated.

Besides the dihydroxy compounds, HO—Y—OH, used in the above examples, others which may be used include such as, ethylene glycol, propylene glycol, diethylene glycol, triethylene glycol, dipropylene glycol, polyethylene glycol, polypropylene glycol, propane-1,3-diol, hexane-1,6-diol, 2-butene-1,4-diol, 2,2-diethyl propane-1,3-diol, and the like.

Besides the isocyanates used in the above examples, others which may be used include such as, n-hexyl isocyanate, 2-ethylhexyl isocyanate, 3,5,5-trimethylhexyl isocyanate, decyl isocyanate, undecyl isocyanate, dodecyl isocyanate, tetradecyl isocyanate, hexadecyl isocyanate, octadecyl isocyanate, 3-isopropoxypropyl isocyanate, cyclohexyl isocyanate and the like, and the use of dialkyl carbamyl chlorides, such as, N,N-di-n-butyl carbamyl chloride, N,N-pentamethylene carbamyl chloride, and the like. The required isocyanate may be made by standard methods, such as, the reaction of the corresponding primary amine with phosgene or by the Curtius rearrangement of organic acid azides. The required carbamyl chloride may be made by the reaction of the corresponding secondary amine with phosgene.

The test solutions were made by dissolving the toxicants in a refined petroleum distillate with not more than 5 percent acetone added as a co-solvent. The results of the tests are given in the table.

It is desirable to use the compounds of the invention together with pyrethrins, allethrin or structurally related insecticides because they act as synergists or extenders for the more expensive latter insecticides.

The compounds of this invention and insecticidal compositions containing the same have been illustrated as being very effective against houseflies. However, these compositions can also be used very effectively against other insect pests.

The effectiveness of compositions of the compounds of the invention using a petroleum distillate as the carrier has been illustrated, but the effective formulations are not limited to this carrier. Other effective carriers are water, in which the compounds are emulsified by means of an emulsifying agent; a liquefiable gas, such as, for example, Freon, in which the compounds are dissolved for the purpose of being used as an aerosol; finely divided solid matter, such as, for example, diatomaceous earth and talc, by which the compounds are absorbed or adsorbed; and the like.

Compositions containing the compounds of the invention may be effectively applied, for example, as space sprays, or as residual deposits on or about such objects as living plants, living animals, stored products, and the like, in order to protect these from insect pests.

RESULTS OF PEET-GRADY TESTS ON COMPOUNDS PLUS ADDED PYRETHRINS OR ALLETHRIN

| Compound of Example No. | Formulation | | | Results | | OTI (official test insecticide) | |
|---|---|---|---|---|---|---|---|
| | Compound, g. per 100 ml. | Pyrethrins, g. per 100 ml. | Allethrin, g. per 100 ml. | 24 hr. kill, Percent | 10 min. knockdown, Percent | 24 hr. kill, Percent | 10 min. knockdown, Percent |
| 1 | .4 | .05 | | 66 | 95 | 31 | 97 |
| 1 | .4 | | .05 | 47 | 91 | 31 | 97 |
| 2 | .4 | .05 | | 77 | 96 | 53 | 97 |
| 2 | .4 | | .05 | 78 | 97 | 53 | 97 |
| 3 | .4 | .05 | | 63 | 95 | 49 | 95 |
| 4 | .4 | .05 | | 72 | 94 | 49 | 95 |
| 5 | .4 | | .05 | 52 | 87 | 42 | 95 |
| 6 | .4 | .05 | | 62 | 94 | 42 | 95 |
| 6 | .4 | | .05 | 62 | 92 | 42 | 95 |
| 7 | .4 | | .05 | 73 | 90 | 62 | 92 |
| 8 | .4 | .05 | | 58 | 94 | 27 | 95 |
| 8 | .4 | | .05 | 48 | 93 | 27 | 95 |
| 9 | .4 | .05 | | 77 | 96 | 25 | 96 |
| 9 | .4 | | .05 | 46 | 94 | 25 | 96 |
| 10 | .4 | .05 | | 92 | 98 | 35 | 98 |
| 10 | .4 | | .05 | 75 | 98 | 35 | 98 |
| 11 | .4 | .05 | | 73 | 96 | 35 | 98 |
| 11 | .4 | | .05 | 77 | 97 | 35 | 98 |
| 12 | .4 | .05 | | 87 | 98 | 53 | 97 |
| 12 | .4 | | .05 | 60 | 93 | 53 | 97 |
| 13 | .4 | .05 | | 62 | 96 | 50 | 99 |
| 13 | .4 | | .05 | 63 | 98 | 50 | 99 |
| 14 | .4 | .05 | | 62 | 87 | 44 | 96 |
| 15 | .4 | .05 | | 52 | 80 | 44 | 96 |
| 15 | .4 | | .05 | 53 | 88 | 44 | 96 |
| 16 | .4 | .05 | | 78 | 92 | 44 | 96 |
| 16 | .4 | | .05 | 53 | 92 | 44 | 96 |
| 17 | .4 | .05 | | 55 | 88 | 40 | 92 |
| 18 | .4 | .05 | | 76 | 92 | 40 | 92 |
| 19 | .4 | .05 | | 68 | 94 | 42 | 98 |
| 20 | .4 | .05 | | 85 | 98 | 42 | 98 |
| 20 | .4 | | .05 | 36 | 93 | 23 | 94 |
| 21 | .4 | .05 | | 85 | 96 | 42 | 98 |
| 21 | .4 | | .05 | 65 | 93 | 32 | 94 |

I claim:
1. The compound represented by the formula

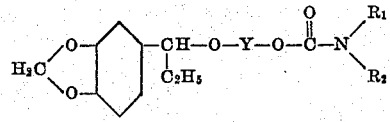

wherein Y is a member of the group consisting of divalent alkylene radicals containing from 2 to 6 carbon atoms and divalent alkylene radicals containing from 2 to 6 carbon atoms which are interrupted by an ethereal oxygen atom, $R_1$ and $R_2$ are selected from the group consisting of the following elements: The hydrogen atom, monovalent alkyl radicals having 1 to 20 carbon atoms, monovalent hydrocarbon cycloalkyl radicals having not more than six carbon atoms in a cyclic ring and having not more than 20 carbon atoms in the radical, monovalent alkoxyalkyl radicals having not more than 12 carbon atoms, the phenyl radical, monovalent aralkyl radicals having 7 to 10 carbon atoms, the furfuryl radical wherein not more than one of $R_1$ and $R_2$ is the furfuryl radical, the tetrahydrofurfuryl radical wherein not more than one of $R_1$ and $R_2$ is the tetrahydrofurfuryl radical, not more than one of $R_1$ and $R_2$ being hydrogen, and elements which form, with the nitrogen atom of

to which they are attached, the piperidino radical, the morpholino radical, the 2-methylpiperidino radical, the 5-ethyl-2 methylpiperidino radical, and the pyrrolidino radical.
2. The compound of the formula
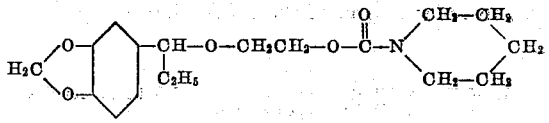
3. The compound of the formula
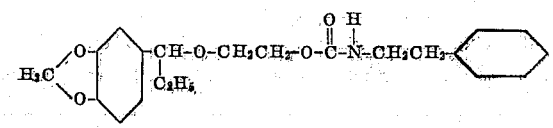
4. The compound of the formula
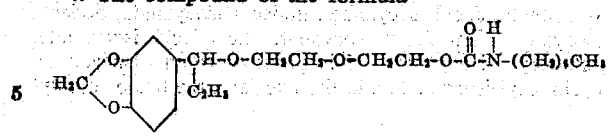
References Cited in the file of this patent
UNITED STATES PATENTS
2,442,555    Synerholm _____ June 1, 1948
OTHER REFERENCES
Prill: Contributions from Boyce Thompson Institute, vol. 14, pp. 221–27.
Brown: A. W. A.—Insect Control by Chemicals, 1951, pp. 115–17.